United States Patent [19]

Cho

[11] Patent Number: 5,396,287
[45] Date of Patent: Mar. 7, 1995

[54] TV CAMERA WORK CONTROL APPARATUS USING TRIPOD HEAD

[75] Inventor: Tadayoshi Cho, Omiya, Japan

[73] Assignee: Fuji Photo Optical Co., Ltd., Saitama, Japan

[21] Appl. No.: 19,253

[22] Filed: Feb. 18, 1993

[30] Foreign Application Priority Data

Feb. 25, 1992 [JP] Japan ................................. 4-075469
Feb. 25, 1992 [JP] Japan ................................. 4-075470
Feb. 25, 1992 [JP] Japan ................................. 4-075471

[51] Int. Cl.$^6$ ............................................. H04N 5/232
[52] U.S. Cl. ..................................... 348/211; 345/161; 345/173; 348/213
[58] Field of Search ............... 348/61, 211, 213; 345/161, 173; H04N 5/232

[56] References Cited

U.S. PATENT DOCUMENTS

| | | | |
|---|---|---|---|
| 4,516,156 | 5/1985 | Fabris | 348/211 |
| 4,566,036 | 1/1986 | Kadosawa | 348/213 |
| 4,827,347 | 5/1989 | Bell | 348/211 |

FOREIGN PATENT DOCUMENTS 228473 12/1984 Japan .

Primary Examiner—Howard W. Britton
Attorney, Agent, or Firm—Ronald R. Snider

[57] ABSTRACT

A TV camera work control apparatus using a tripod head so as to accurately select a plurality of given shooting positions and conditions. A transparent touch panel divided into a plurality of touch inputting portions is used to control the position and the shooting operation of a TV camera. The touch panel is disposed on a monitor screen. When a shooting position is selected by pressing one of the divided touch inputting portions, a shooting operation such as panning, tilting, zooming and focusing is controlled. The zooming operation may be controlled by the magnification which is proportional to the pressure applied to the touch inputting portion or the time for which the touch inputting portion is pressed. It is possible to the current operation parameters are corrected with reference to the preceding operating state, when a signal is input again from one of the touch inputting portions. It is also possible to automatically set the operation parameters for the touch inputting portions of the touch panel by inputting the operation parameters for, for example, the two ends of a diagonal of the touch panel.

9 Claims, 12 Drawing Sheets

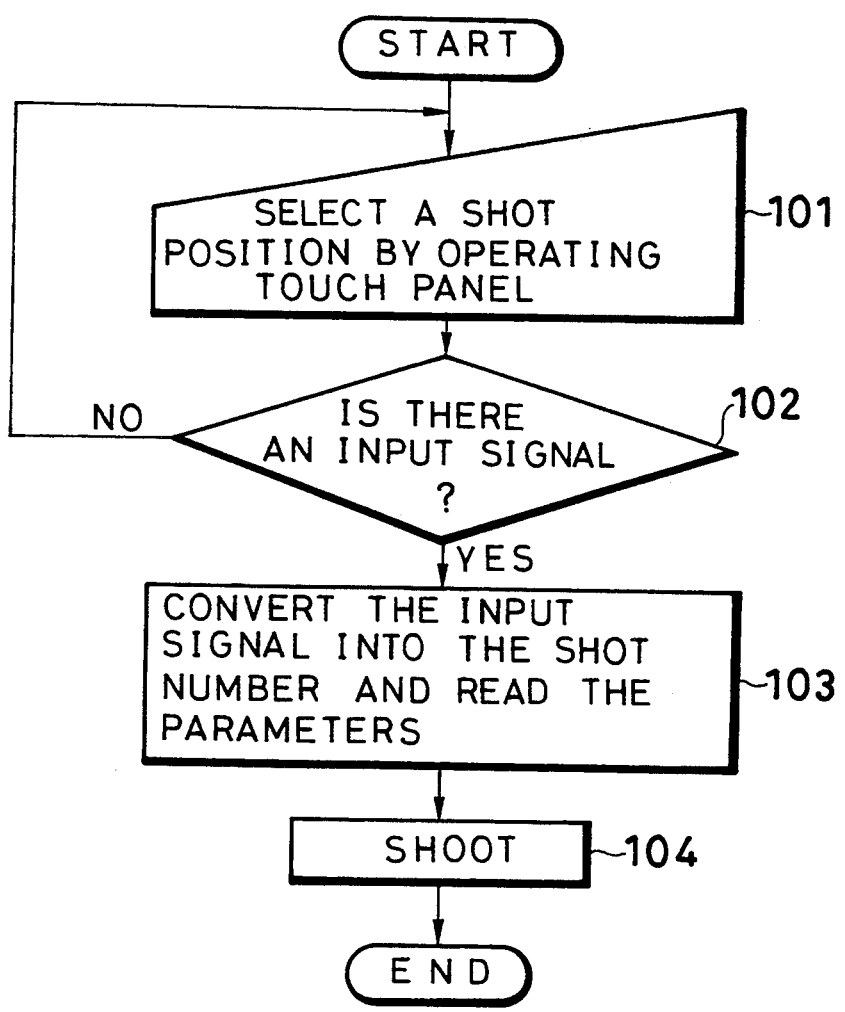

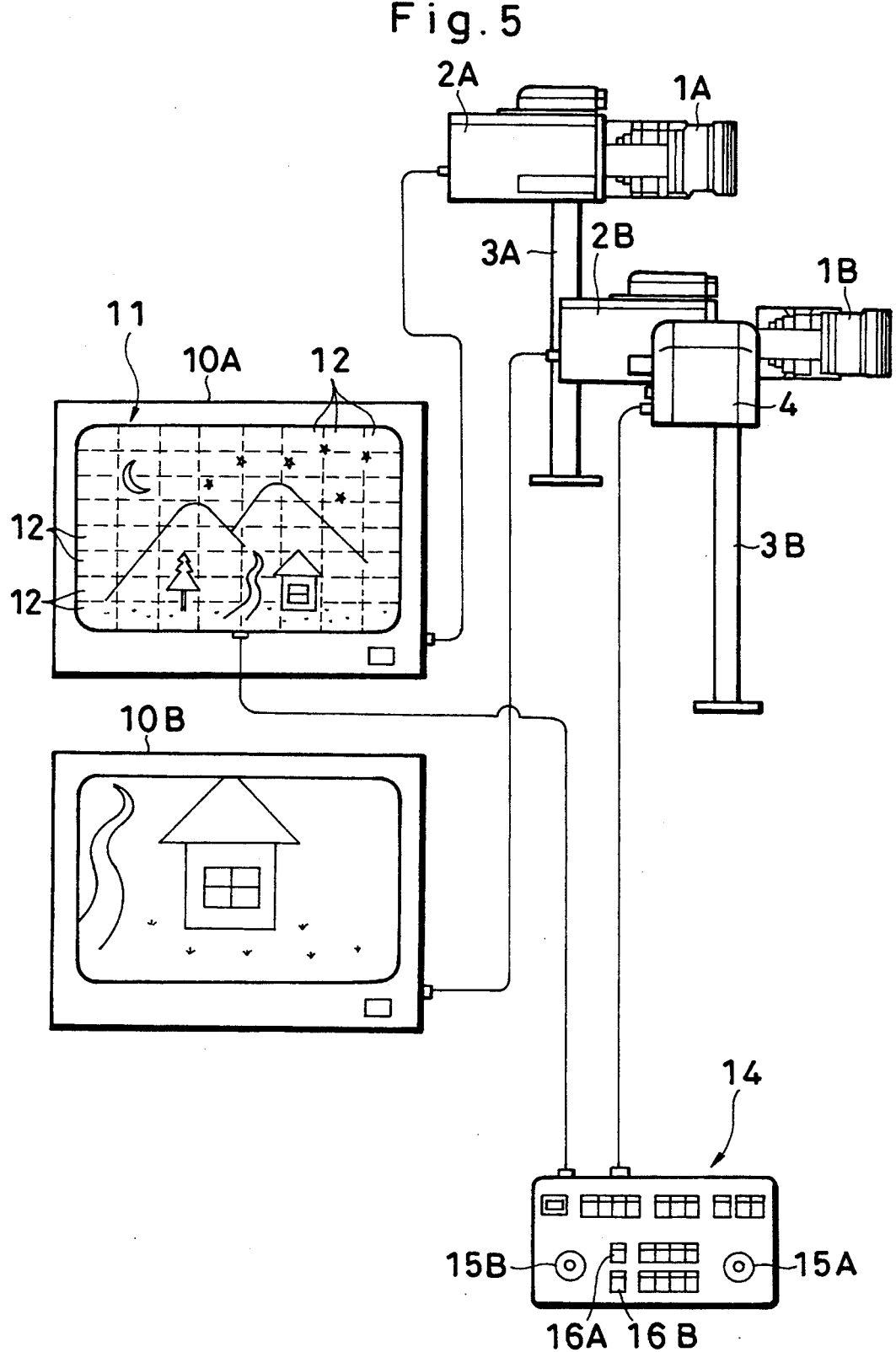

TV CAMERA WORK CONTROL APPARATUS USING TRIPOD HEAD

BACKGROUND OF THE INVENTION

This application claims the priority of Japanese Patent Application Nos. 4-75469, 4-75470 and 4-75471 filed on Feb. 25, 1992, which are incorporated herein by reference.

1. Field of the Invention

The present invention relates to a TV camera work control apparatus using a tripod head and, more particularly, to the camera work control for shooting under preset conditions while directing TV cameras in given directions by remote control.

2. Description of the Related Art

When a scene is shot by a TV camera, the position and the angle of the subject are varied in accordance with preset conditions by remote-controlling one or a plurality of TV cameras. For this purpose, a system apparatus including a TV camera mounted on a tripod head is used.

FIG. 13 shows the structure of a conventional TV camera work control apparatus using a tripod head. A TV camera 2 having a lens portion 1 is mounted on a tripod head 4 which is supported by a column 3. The tripod head 4 accommodates a driving mechanism which pans (moves) the TV camera 2 (in the horizontal direction) by horizontal rotation or tilts (moves) the TV camera 2 (in the vertical direction) by vertical rotation. A monitor 5 for inputting a video signal from the TV camera 2 and an operation controller 6 for controlling the operations of the TV camera 2 and the tripod head 4 are disposed in an operation chamber or the like.

According to such an apparatus, by operating the tripod head 4 by the operation controller 6, the TV camera 2 is directed in any given direction and the operation of the camera such as zooming and focusing is controlled by the lens portion 1. A shot is taken while the preset conditions (parameters) of panning, tilting, zooming (magnification) and focusing (focal length) are satisfied. That is, in the base picture displayed on the monitor 5 in FIG. 13, each shooting parameter which corresponds to the selected positions A, B, C, D . . . is recorded and preset for the respective buttons a, b, c, d . . . of a switch 7. By appropriate operation of the buttons a, b, c, d . . . of the switch 7, it is therefore possible take a shot at predetermined positions. A conventional tripod head control apparatus is disclosed in, for example, Japanese Patent Laid-Open No. 228473/1984.

In the above,described conventional TV camera work control apparatus using a tripod head, however, since the plurality of shot positions A, B, C, D . . . are selected optionally, it is difficult to know the correspondence of the shot positions A, B, C, D . . . and the buttons a, b, c, d . . . of the switch 7. In other words, after the shot positions A, B, C, D . . . are set, it is impossible to confirm these positions on the screen, so that the operator judges to which shot positions the buttons a, b, c, d . . . of the switch 7 respectively correspond from the memory of the operator or the notes jotted down by the operator. As a result, there is a possibility of taking a shot at different shot positions by mistake and it is not easy to take a shot at the correct positions.

It is also laborious to set parameters for panning, tilting, zooming (magnification) and focusing (focal length) for each of the buttons a, b, c, d . . . of the switch 7. The more the number of parameters, the more laborious the shooting operation becomes and the more time is necessary for setting the parameters, which is waste of time.

SUMMARY OF THE INVENTION

Accordingly, it is an object of the present invention to eliminate the above-described problems in the related art and to provide a TV camera work control apparatus using a tripod head which is capable of accurately selecting a plurality of given shot positions and conditions and which facilitates any given camera word.

It is another object of the present invention to provide a TV camera work control apparatus using a tripod head which makes it easy to set shooting parameters with respect to the shot positions.

To achieve this aim, the present invention provides a TV camera work control apparatus using a tripod head for controlling both the position and the shooting operation of the lens portion of a TV camera by using a touch panel divided into a plurality of touch inputting portions. The touch panel is transparent and is disposed on a monitor screen. Touch inputting portions are set on the touch panel in such a manner as to divide the monitor screen in a matrix. The operation parameters for the tripod head and the lens portion of the TV camera for shooting at the positions corresponding to the touch inputting portions are stored in a memory. According to this structure, it is easy to select a shot position by pressing one of the divided touch inputting portions with a finger or the like while watching the picture observed through the transparent touch panel. When the signal of the selected touch inputting portion is supplied to the controller, the shooting parameters is read out of the memory, and the shooting operation is executed in accordance with these parameters. The parameters are, for example, for panning, tilting, zooming (magnification) and focusing (focal length).

This structure may be applied either to one set of TV camera, tripod head and monitor or to plural sets of TV cameras, tripod heads and monitors. In the latter case, it is possible, for example, to display a base picture on a monitor which is provided with the touch panel and to display on another monitor a picture of the TV camera which is controlled by the touch panel.

It is possible to automatically set the operation parameters for the touch inputting portions of the touch panel by inputting the operation parameters for at least two (it may be three or four) points, for example, at both ends of a diagonal of the touch panel. According to this structure, by setting the operation parameters for two points, the operation parameters for the entire range of the touch panel are automatically calculated and the calculated parameters are stored in the memory. It is therefore possible to set the operation parameters simply and rapidly.

It is further possible to control the positions and the shooting operation by using a touch panel having a plurality of divided touch inputting portions and to control the zooming operation by the magnification which is proportional to the pressure applied to the touch inputting portion or the time for which the touch inputting portion is pressed. According to this structure, a signal which is proportional to, for example, the pressure applied to the touch inputting portion by a finger or the like is input when the position of the camera is selected in accordance with each touch inputting portion of the transparent touch panel, and the magnification by zooming is calculated in accordance with the signal. Thereafter, in accordance with the calculated output, the zooming of the lens portion of the TV camera is controlled. The above-described automatic setting of the operation parameters is applicable to this structure except for setting of the magnification by zooming.

When a signal is input again from a touch inputting portion of the touch panel, the current operation parameters are corrected with reference to the preceding operating state, thereby facilitating the positioning of the TV camera to the target shot position.

The above and other objects, features and advantages of the present invention will become clear from the following description of the preferred embodiments thereof, taken in conjunction with the accompanying drawings.

BRIEF DESCRIPTION OF THE DRAWINGS

FIG. 3 is a flowchart of the operation of the first embodiment shown in FIG. 1;

FIG. 5 shows the structure of a second embodiment of a TV camera work control apparatus using a tripod head according to the present invention;

DESCRIPTION OF THE PREFERRED EMBODIMENTS

First Embodiment

Figure 1:
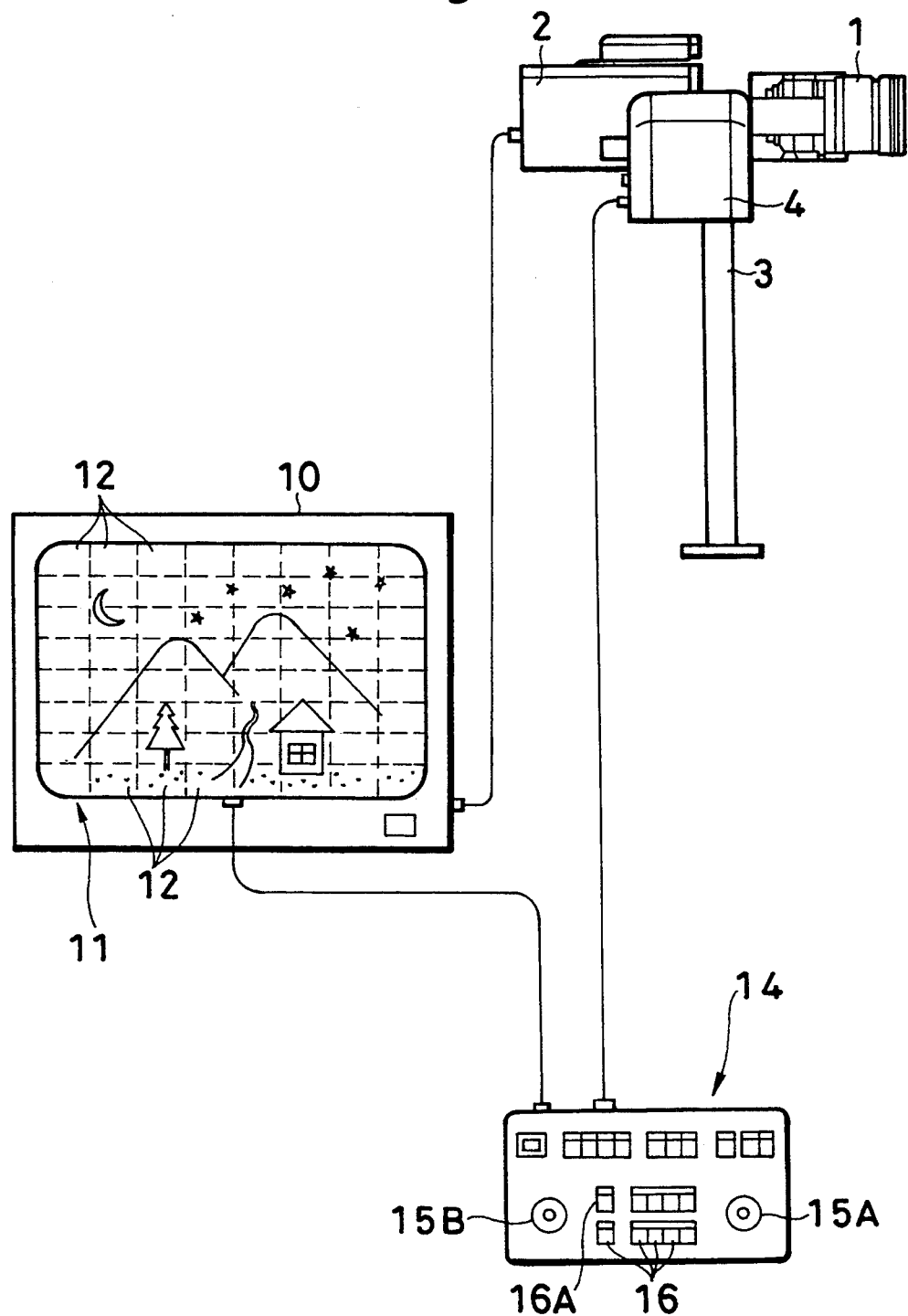
FIG. 1 shows the structure of a first embodiment of a TV camera work control apparatus using a tripod head according to the present invention.
Figure 2:
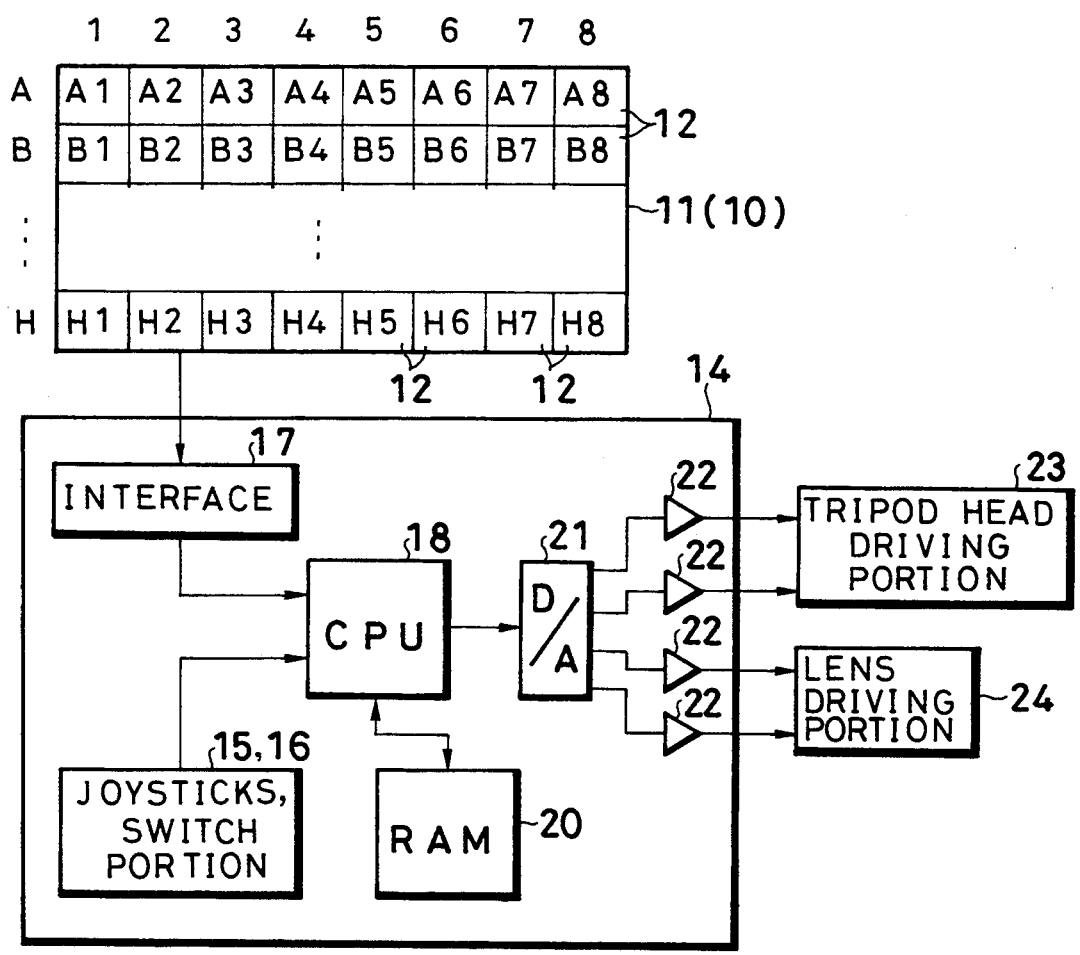
FIG. 2 is a circuit diagram of the first embodiment shown in FIG. 1.

FIG. 1 shows the structure of a first embodiment of a TV camera work control apparatus using a tripod head, and FIG. 2 is a circuit diagram thereof. In FIG. 1, a TV camera 2 having a lens portion 1 is mounted on a tripod head 4 which is supported by a column 3 in the same way as in a conventional apparatus. The tripod head 4 is capable of driving the TV camera 2 in the panning (horizontal) direction or in the tilting (vertical) direction. A monitor 10 for inputting a video signal and displaying the picture is connected to the TV camera 2, and a touch panel 11 is attached to the monitor 10 in such a manner as to cover the entire region of the screen of the monitor 10.

The touch panel 11 is made of a transparent material and a plurality of touch inputting portions 12 are set in a matrix on the touch panel 11. It is possible to adopt any of the capacitance system, the surface acoustic wave system, the resistance film system, the infrared rays system, etc. to the touch panel 11. In the case of using the touch panel 11 of the capacitance system, for example, it is possible to know the state in which the panel surface 11 is in contact with the monitor screen 10 by a change in the capacitance, and to detect the position at which the touch panel 11 is in contact with the monitor screen 10 by a change in the micro AC current (signal) supplied to the touch panel 11. The position at which the touch panel 11 is in contact with the monitor screen 10 is output as the information on the coordinates, so that the shot position (shot number) corresponding to each touch inputting portion 12 is identified. In this embodiment, the touch panel 11 is divided in to 8 divisions both in the vertical direction and in the horizontal direction, so that 64 touch inputting portions 12 are formed on the entire screen. Alternatively, the touch panel 11 may be divided into 16 divisions in the vertical and horizontal directions, respectively.

An operation controller 14 is connected to the lens portion 1 and the tripod head 4 of the TV camera 2. The touch panel 11 is connected to the operation controller 14. The operation controller 14 has a joystick 15A for panning or tilting the TV camera 2 and a joystick 15B for zooming or focusing the TV camera 2. These joysticks 15A, 15B singly can operate the tripod head 4 and the TV camera 2. They actually move the lens portion 1 to the position at which a picture is shot (shot position) and each parameter for a shooting operation is set by and stored in the operation controller 14. A reset button 16A is attached to a switch portion 16 of the operation controller 14. The reset button 16A may be provided on the monitor 10.

As shown in FIG. 2, if the symbols A to H are allotted to the 8 divisions of the ordinate and the numerals 1 to 9 are allotted to the 8 divisions of the abscissa in the coordinates of the touch panel 11, the touch inputting portions 12 having the shot numbers (identification numbers obtained from the coordinates) A1, A2 ... H7 and H8 are set. The operation controller 14 is provided with an interface 17, a CPU (central processing unit) 18, a writable memory (RAM) 20, a D/A converter 21 and amplifiers 22 as well as the joysticks 15 and the switch portion 16. The RAM 20 stores the parameters for the shooting operations of panning, tilting, zooming (magnification) and focusing in correspondence with the shot number of each touch inputting portion 12. It is possible, for example, that the basic data for each shot number are preset in accordance with the base picture for which the TV camera 2 is set, and that only when the shooting operation different from the preset state is necessary, the TV camera 2 is moved by the joysticks 15A and 15B, which operations are set as the parameter information.

A tripod head driving portion 23 disposed in the tripod head 4 and a lens driving portion 24 disposed in the lens portion 1 are connected to the amplifiers 22, and control signals for a shooting operation are supplied to the tripod head driving portion 23 and the lens driving portion 24 in accordance with the parameter information which is read from the RAM 20 by the CPU 18.

In this embodiment having the above-described structure, the CPU 18 operates as shown in FIG. 3.

At step 101, a touch inputting portion 12 of the touch panel 11 is pressed down so as to select a shot position. At step 102, whether or not the touch inputting portion 12 has been operated is judged If the answer is "YES", the process proceeds to step 103. At step 103, the selected shot position at the touch inputting portion is converted into the corresponding shot number, and the parameters representing the information on panning, tilting, zooming and focusing are read out of the RAM 20 in correspondence with the shot number. At subsequent step 104, the control signals based on the information on panning and tilting are supplied to the tripod head driving portion 23, and the control signals based on the information on zooming and focusing are supplied to the lens driving portion 24. The shooting operation is executed in accordance with these control signals.

Figure 4A:
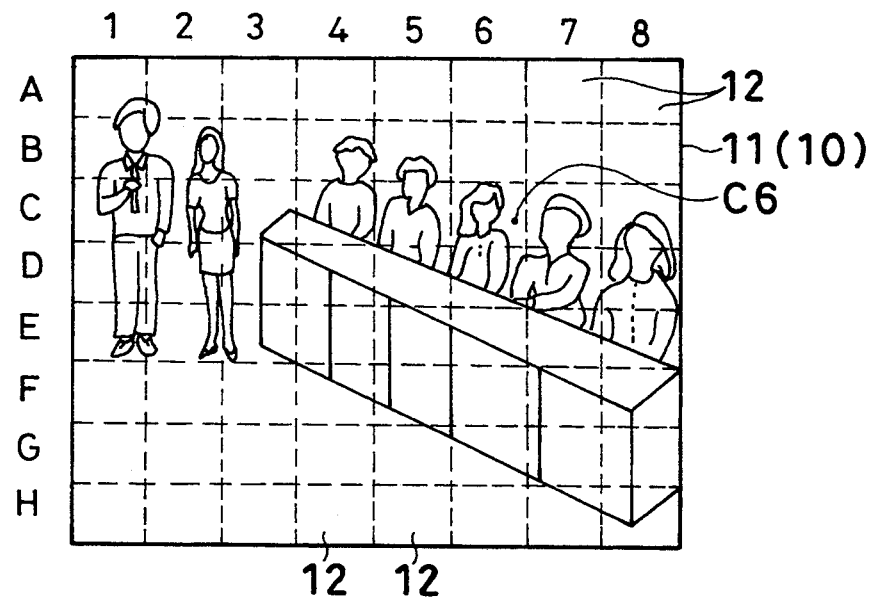
FIG. 4A shows a base picture displayed on a monitor.
Figure 4B:
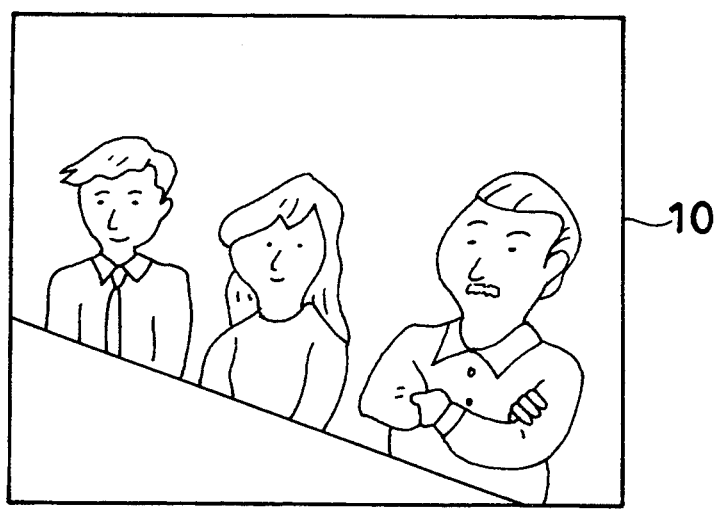
FIG. 4B shows a picture displayed by a shooting operation.

FIGS. 4A and 4B show the pictures displayed on the screen of the monitor 10. In the base picture shown in FIG. 4A, it is possible to press any portion of the touch panel 11. For example, when the shot number C6 is selected, a shot picture enlarged by a preset magnification with the portion indicated by the shot number C6 as the center of the picture is displayed.

When the reset button 16A of the operation controller 14 is pressed down, the monitor 10 displays again the base picture shown in FIG. 4A. In this state, if another touch inputting portion 12 of the touch panel 11 is pressed down, a picture at the corresponding position is shot and displayed. In this case, it is possible to display the super-imposed base picture at a corner of the screen while displaying the shot picture on the monitor 10.

As explained above, according to the first embodiment, since the touch panel is provided on the monitor screen, and the parameters for operating the tripod head and the TV camera so as to shoot at the position corresponding to each touch inputting portion are stored in the memory, it is possible to control the shooting operation by operating the touch panel. Thus it is possible to take a shot while confirming the position at the shot picture. It is therefore possible to accurately select a plurality of given shot positions without depending on the memory of the operator or the notes jotted down by the operator as in a conventional TV camera work control apparatus.

Although only one set of the TV camera 2 having the tripod head 4 and the monitor 10 is used in the first embodiment, it is possible to provide plural sets of the TV cameras 2 and the monitors 10 and to combine them with each other.

Second Embodiment

Figure 6:
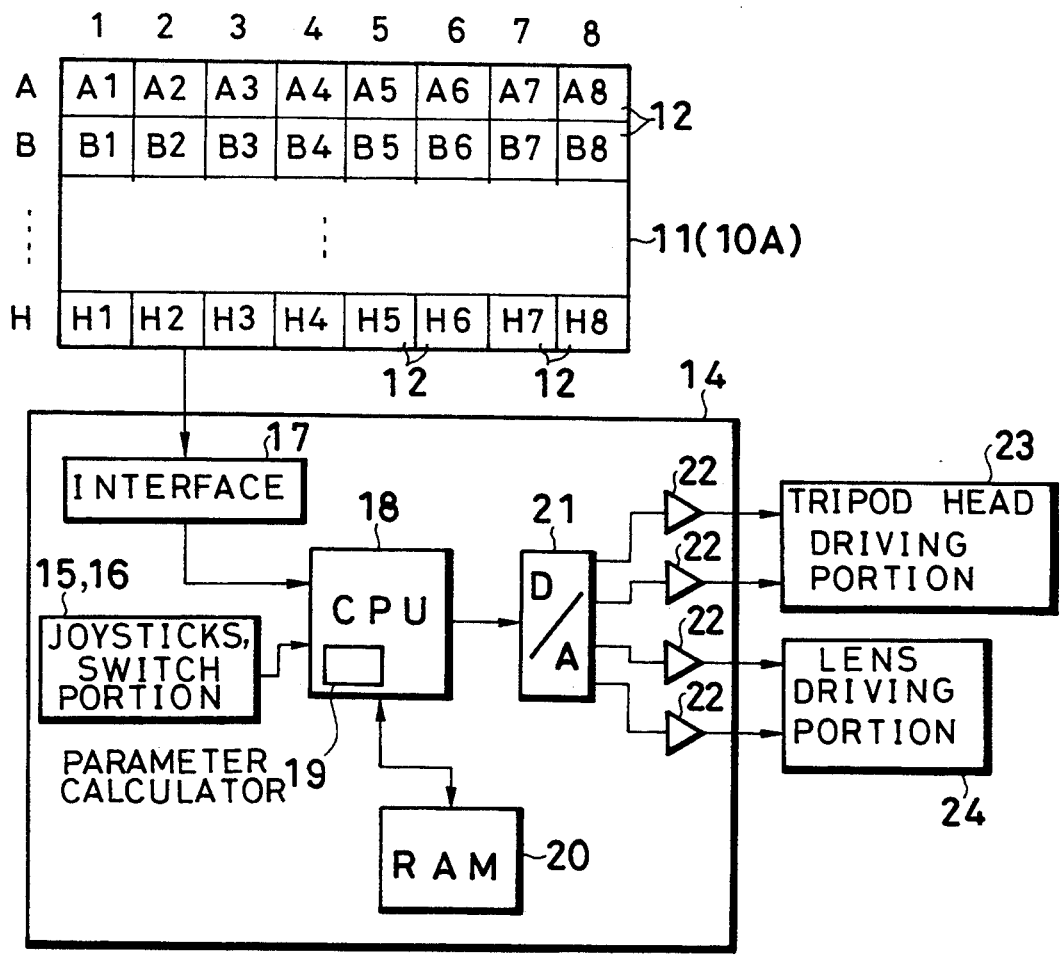
FIG. 6 is a circuit diagram of the structure of the second embodiment shown in FIG. 5.

FIG. 5 shows the structure of a second embodiment of a TV camera work control apparatus using a tripod head according to the present invention, and FIG. 6 is a circuit diagram thereof. In the second embodiment shown in FIG. 5, two sets of camera systems are provided. A TV camera 2A having a lens portion 1A for taking a base picture is supported by a column 3A. A TV camera 2B having a lens portion 1B for taking a shot is mounted on a tripod head 4 which is supported by a column 3B. The tripod head 4 is capable of driving the TV camera 2B in the panning (horizontal) direction or in the tilting (vertical) direction. A monitor 10A for inputting a video signal and displaying the image is connected to the TV camera 2A, and a monitor 10B is connected to the TV camera 2B. The touch panel 11 is attached to the monitor 10A in such a manner as to cover the entire region of the screen of the monitor 10A.

The touch panel 11 is the same as that in the first embodiment, and 64 touch inputting portions 12 are formed on the entire screen.

The operation controller 14 is connected to the lens portion 1B and the tripod head 4 of the TV camera 2B. The touch panel 11 of the monitor 10A is connected to the operation controller 14. In the operation controller 14, the joysticks 15A, 15B singly can operate the tripod head 4 and the TV camera 2B in the same way as in the first embodiment. They actually move the lens portion 1B to the position at which a picture is shot (shot position) and each parameter for shooting is set by and stored in the operation controller 14. An automatic set button 16B for automatically setting the parameters for a shooting operation as well as the reset button 16A is provided in the operation controller 14.

As shown in FIG. 6, the touch inputting portions 12 having the shot numbers A1, A2 . . . H7 and H8 are set on the touch panel 11. The operation controller 14 is provided with the joysticks 15, the switch portion 16, the interface 17, the CPU (central processing unit) 18, the writable memory (RAM) 20, the D/A converter 21 and the amplifiers 22 in the same way as in the first embodiment. A parameter calculator 19 is provided in the CPU 18. The parameter calculator 19 can calculate the operation parameters for the entire region from two values for at least two operation parameters, namely, two values for panning and tilting and two values for zooming (magnification) and focusing, respectively. The RAM 20 stores the parameters for each shooting operation in correspondence with the shot number of each touch inputting portion 12. When the operation parameters are calculated by the parameter calculator 19, the calculated parameters are stored in the RAM 20.

Figure 7:
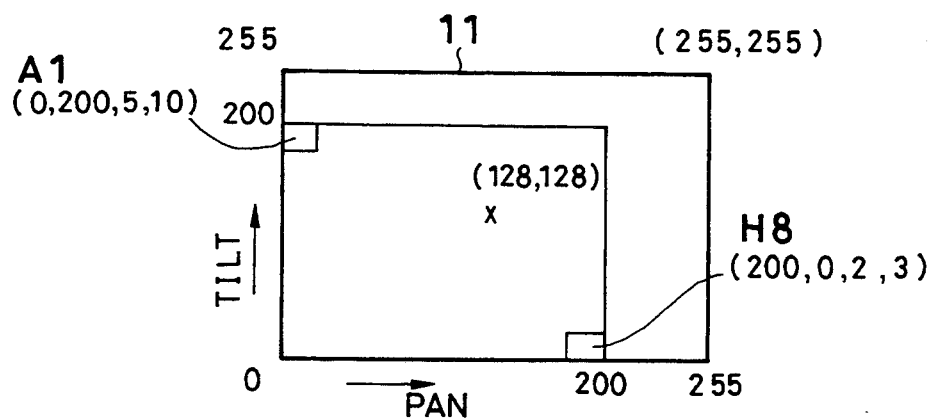
FIG. 7 is an explanatory view of parameters set in two points in a diagonal direction.

It is possible to automatically set the operation parameters for the entire region by setting the operation parameters for two points in a diagonal direction of the touch panel 11. As shown in FIG. 7, for example, values 0 to 255 are allotted to the panning positions (X-coordinates) and the tilting positions (Y-coordinates) on the touch panel 11 in correspondence with the shot positions. Each shot position has these coordinates as the parameters. For example, the parameters at the center position are coordinates (128, 128). Therefore, if the two points having the shot numbers A1 and H8 in a diagonal direction of the touch panel 11 are selected in FIG. 4A, and the values of panning, tilting, zooming and focusing (0, 200, 5 [times], 10 [m]) are set at the shot number A1 and (200, 0, 2 [times], 3 [m]) are set at the shot number H8, the parameter calculator 19 calculates the operation parameters for the shot numbers in the entire region, and the calculated parameters are stored in the RAM 20. It is possible to renew the parameters individually by the operation of the joysticks 15A and 15B and the switch portion 16.

The tripod head driving portion 23 disposed in the tripod head 4 and the lens driving portion 24 disposed in the lens portion 1B are connected to the amplifiers 22, and control signals for a shooting operation are supplied to the tripod head driving portion 23 and the lens driving portion 24 in accordance with the automatically set parameters.

Figure 8:
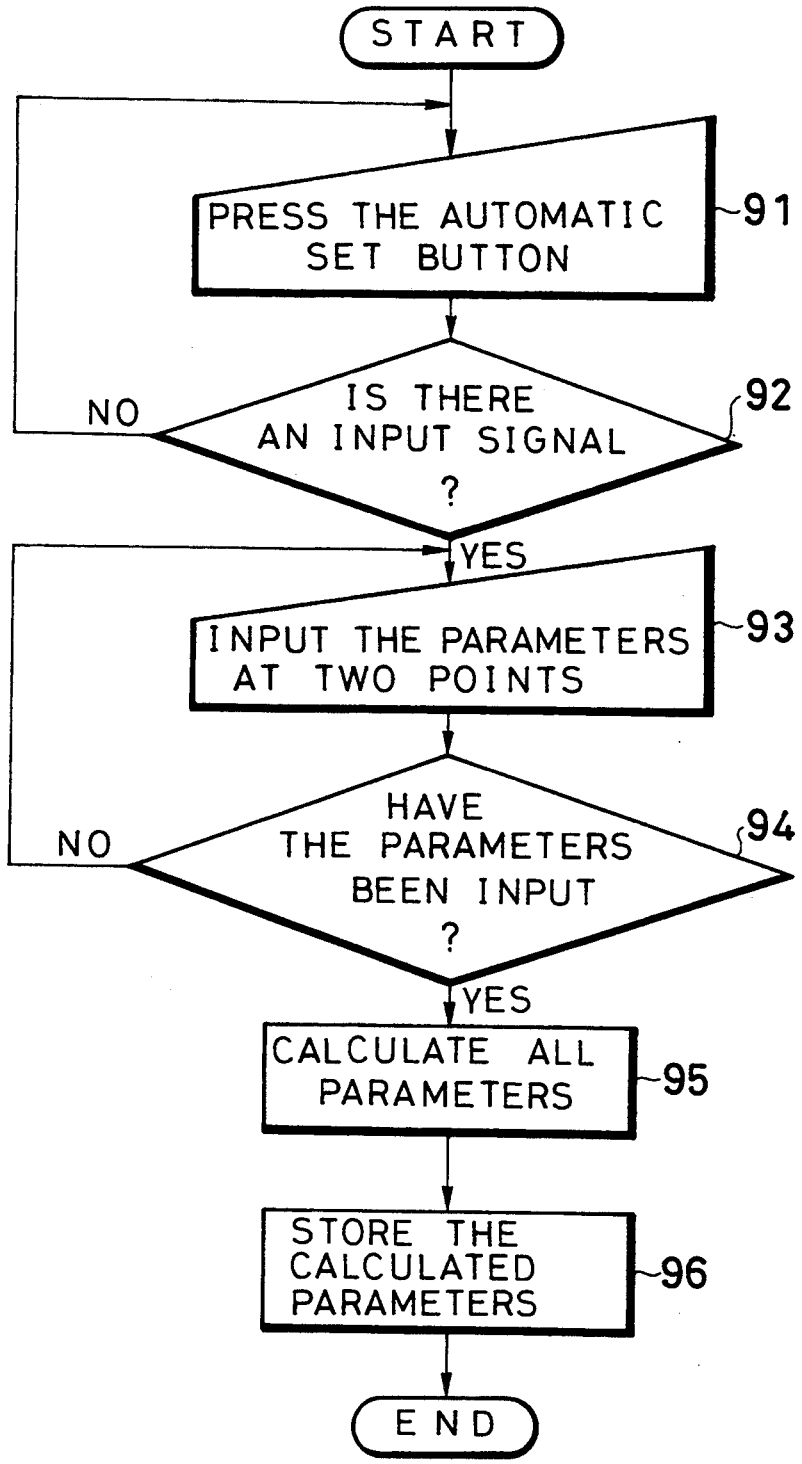
FIG. 8 is a flowchart of the operation of setting parameters in the second embodiment.

In the second embodiment having the above-described structure, the CPU 18 operates as shown in FIGS. 8 and 3.

FIG. 8 shows the operation of automatically setting the parameters for shooting operations. At step 91, when the automatic set button 16B is pressed down, whether or not the automatic set button has been pressed down is judged at step 92 If the answer is "YES", the process proceeds to step 93. At step 93, the parameters at two points (two shot numbers) in a diagonal direction of the touch panel 11 are input, and whether or not the parameters at the two points have been actually input is judged at step 94. If the answer is "YES", the process proceeds to step 95

The parameters are input at step 93 by operating the joysticks 15A, 15B of the operation controller 14. For example, the TV camera 2 is actually set so as to take a shot at the position of the shot number A1, and the parameters for panning, tilting, zooming and focusing are then set. Similarly, the parameters for the shot number H8 are next set. At step 95, the parameters for all the shot numbers are automatically calculated from the parameters for the two points of the shot numbers A1 and H8. These calculated parameters are stored in the RAM 20 at step 96. If the parameters A1 (0, 200, 5 (times), 10) and H8 (200, 0, 2 [times], 3) are set at the base picture shown in FIG. 4A, with respect to a zooming operation, the magnification is set so as to gradually vary from 5 times to 2 times from the right end portion to the left end portion. In this way, it is easy to set the parameters. Therefore, especially when the subjects are arranged perspectively, as shown in FIG. 4A, it is very easy to set the magnification.

The shooting operation is executed in the same way as in the first embodiment. At step 101, a touch inputting portion 12 of the touch panel 11 is pressed down so as to select the shot position. At step 102, whether or not the touch inputting portion 12 has been operated is judged, and at step 103, the parameters representing the information on panning, tilting, zooming and focusing are read out in accordance with the shot numbers. At the subsequent step 104, the shooting operation is executed in accordance the control signals based on the information on panning, tilting, zooming and focusing.

If it is assumed that the base picture shown in FIG. 4A, when the shot number C6, for example, is selected, the picture shown in FIG. 4B is displayed on the monitor 10B. On the monitor 10B, the picture enlarged by the magnification calculated by the parameter calculator 19 is shot and displayed with the portion indicated by the shot number C6 as the center of the picture.

If another touch inputting portion 12 of the touch panel 11 is pressed down, a picture at the selected position is shot and displayed on the monitor 10B in place of the picture of the shot number C6. When the reset button 16A of the operation controller 14 is pressed down, the monitor 10B displays again the base picture shown in FIG. 4A.

As described above, according to the second embodiment, since the operation parameters for the entire region of the touch panel are calculated and stored by inputting the operation parameters for at least two points of the touch inputting portions, it is possible to automatically and very easily set the parameters for the shooting operations.

Although the parameters for the entire region are set on the basis of the parameters for two points in a diagonal direction of the touch panel 11 in the second embodiment, the parameters at two points in the vertical direction, two points in the horizontal direction, four points in the vertical and horizontal directions, or four points in the vertical and horizontal directions with the center point added thereto may be used in order to set the parameters for the entire region.

Two sets of TV camera systems are used in the second embodiment, but only one set of the TV camera 2, the tripod head 4 and the monitor 10 may be used so as to switch between the base picture and the shot picture.

Third Embodiment

Figure 9:
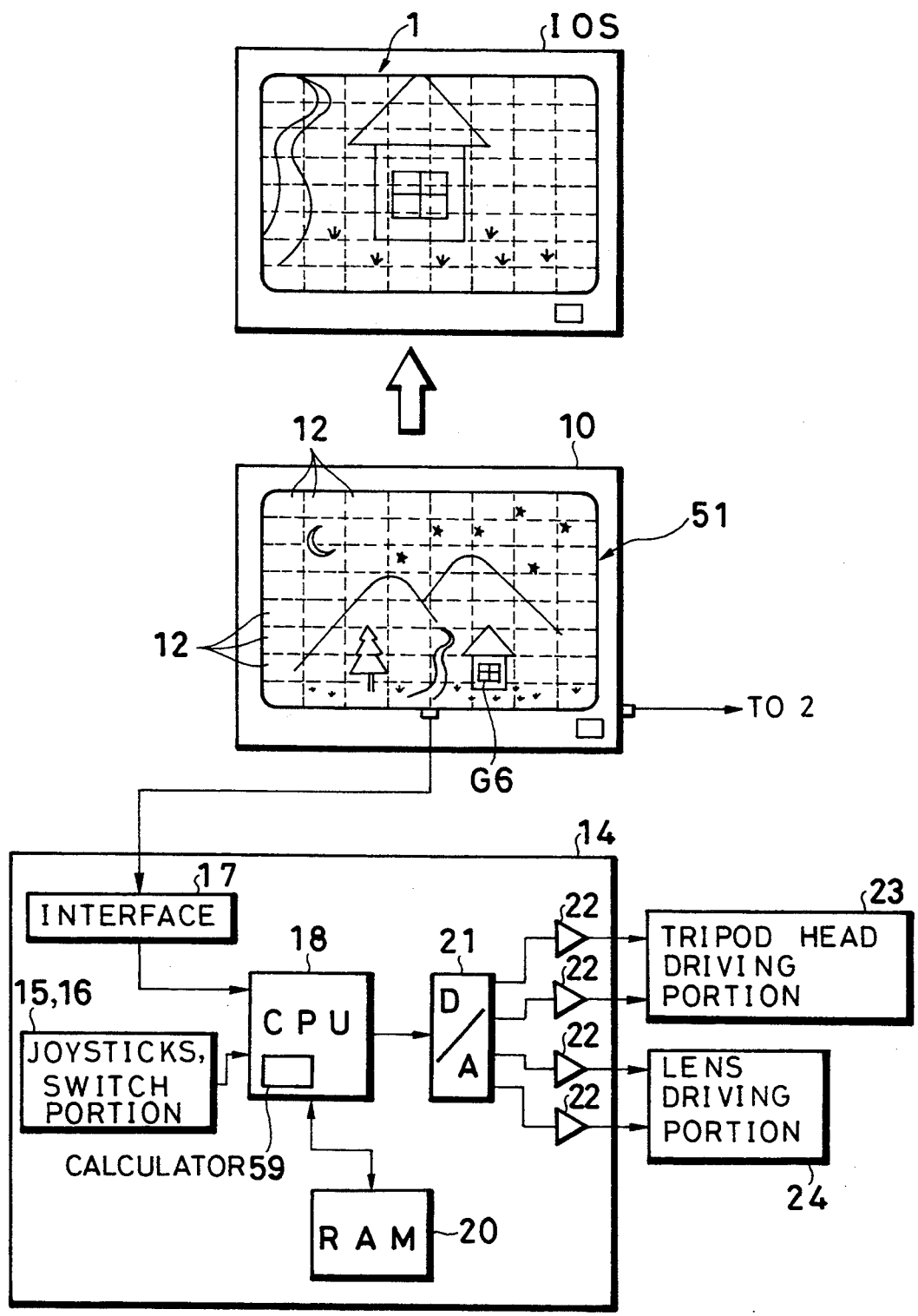
FIG. 9 shows the structure of a third embodiment of a TV camera work control apparatus using a tripod head according to the present invention.

FIG. 9 shows the structure of a third embodiment of a TV camera work control apparatus using a tripod head according to the present invention. The third embodiment is provided with the lens portion 1, the TV camera 2 and the tripod head 4 in the same way as in the first and the second embodiments but these elements are omitted in FIG. 9. Similarly, the monitor 10 for inputting video signals and displaying a picture is connected to the TV camera 2. A transparent touch panel 51 is attached to the monitor 10 in such a manner as to cover the entire region of the screen of the monitor 10. It is possible to adopt any of the capacitance system, the surface acoustic wave system, the resistance film system, and the infrared rays system, etc. to the touch panel 51. In the case of using the touch panel 51 of the capacitance system, for example, it is possible to know the state in which the panel surface 51 is in contact with the monitor screen 10 by a change in the capacitance and to detect the position at which the touch panel 51 is in contact with the monitor screen 10 by a change in the micro AC current (signal) supplied to the touch panel 51. The position at which the touch panel 51 is in contact with the monitor screen 10 is output as the information on the XY coordinates, so that the position of each touch inputting portion 12 is identified.

In this embodiment, it is possible to take out a signal on the Z-axis which shows the state in which the panel 51 is pressed down. For example, by electrically taking out a change in the thickness of an intermediate electrode layer which is disposed between the surface layer and the back layer of the panel 51, it is possible to detect the pressure applied to the panel 51. In this embodiment, the change in the pressure is detected in the range of 0 to 255 (Z values), and the magnification by zooming is calculated on the basis of the pressure signal. In place of the pressure signal, it is possible to use a detection signal for the time for which the touch inputting portion 12 is in contact.

The touch inputting portions 12 having the shot numbers A1, A2 . . . H7 and H8 are set on the touch panel 51. The touch panel is connected to the operation controller 14. The operation controller 14 is provided with the interface 17, the CPU (central processing unit) 18, a magnification and P (pan)/T (tilt) calculator 59 disposed in the CPU 18, a writable memory (RAM) 20, the D/A converter 21 and the amplifiers 22 as well as the joysticks 15 for panning and tilting or zooming and focusing and the switch portion 16. The RAM 20 stores the data on the zoom ratio which corresponds to the position to which the lens 1 zooms.

The magnification and P (pan)/T (tilt) calculator 59 calculates the positions of panning and tilting and the magnification by zooming on the basis of the signal representing the pressure applied to the touch inputting portion 12 (this signal will be referred to "pressure signal" hereinunder). The magnification data which is proportional to the pressure (when the pressure is low, the magnification is small, and when the pressure is high, the magnification is large) is calculated and output by the calculator 59. In this embodiment, it is possible to cancel and start again a shooting operation even in the process of a zooming operation at the touch panel 51. For this purpose, the correction coefficient is read out of the RAM 20, and the correction is executed by the calculator 59.

Figure 10A:
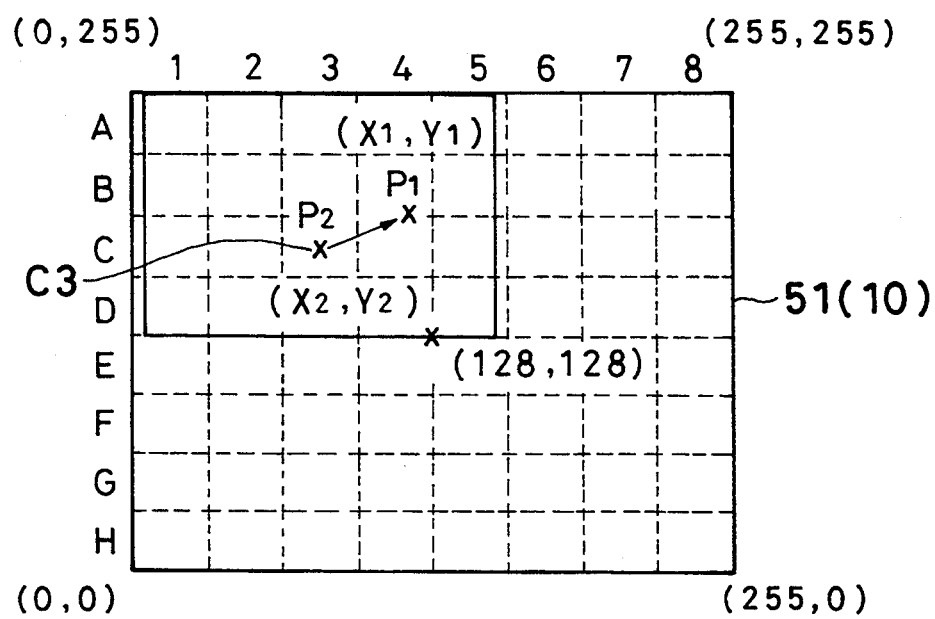
FIG. 10A explains the positional relationship between two points in a base picture which are to be panned and tilted.
Figure 10B:
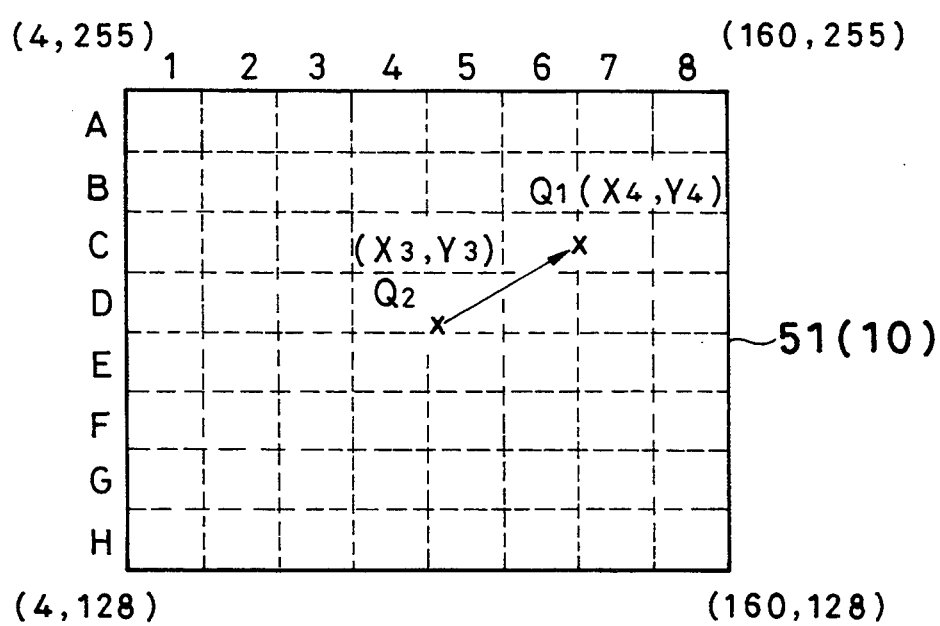
FIG. 10B explains the positional relationship between the two points tilted and panned from the base picture shown in FIG. 10A.

As shown in FIG. 10A, for example, values 0 to 255 are allotted to the panning positions (X-coordinates) and the tilting positions (Y-coordinates) on the touch panel 51 in correspondence with the shot positions. Each shot position has these coordinates as the parameters. For example, the parameters at the center position are coordinates (128, 128). In FIG. 10A, when the target object is at the point P1 (X1, Y1), if the shot number C3 containing the point P2 (X2, Y2) is selected by mistake at the touch inputting portion 12 due to the angle at which the picture is watched or the like, and the touch inputting portion 12 is operated by a predetermined pressure, the point P2 (X2, Y2) is moved to the center point Q2 (X3, Y3) of the coordinates, and the object is shifted to the point Q1 (X4, Y4). Therefore, if the shot number C7 containing Q1 is pressed again in the state shown in FIG. 10B, it is necessary to calculate the distance between the points Q1 and Q2 in terms of the distance between the points P1 and P2 in FIG. 10A. This calculation is executed by the P/T calculator 59.

The tripod head driving portion 23 disposed in the tripod head 4 and the lens driving portion 24 disposed in the lens portion 1 are connected to the amplifiers 22, and control signals for a shooting operation are supplied to the tripod head driving portion 23 and the lens driving portion 24 by the CPU 18 in accordance with the parameters read out of the RAM 20.

The third embodiment has the above-described structure, and the position of the tripod head is calculated by pressing down the touch inputting portion 12. In FIG. 9, if the shot number G6 is selected and the touch inputting portion 12 having the shot number G6 is pressed down, the target object with the cabin, which is the target object, enlarged is displayed on the monitor 10S. That is, the CPU 18 detects the shot number G6 from the touch panel 51, and the calculator 59 calculates the panning and tilting positions in correspondence with the shot number G6. When the movement of the tripod driving portion 23 is controlled on the basis of the information on the panning and tilting positions, the cabin is moved to the center of the picture.

The pressure signal from the touch inputting portion 12 is supplied to the CPU 18, and the magnification and P/T calculator 59 calculates the magnification by zooming in accordance with the pressure signal. The lens driving portion 24 is controlled in accordance with the zooming magnification controlling signal, thereby executing zooming. If the cabin is enlarged too much, the magnification is reduced by re-pressing the touch inputting panel 12 with a slightly smaller force. On the other hand, if the enlargement is insufficient, the magnification is increased by re-pressing the touch inputting panel 12 with a slightly larger force. It is possible to adjust the focus automatically by providing the lens portion 1 with an autofocusing function.

Figure 11:
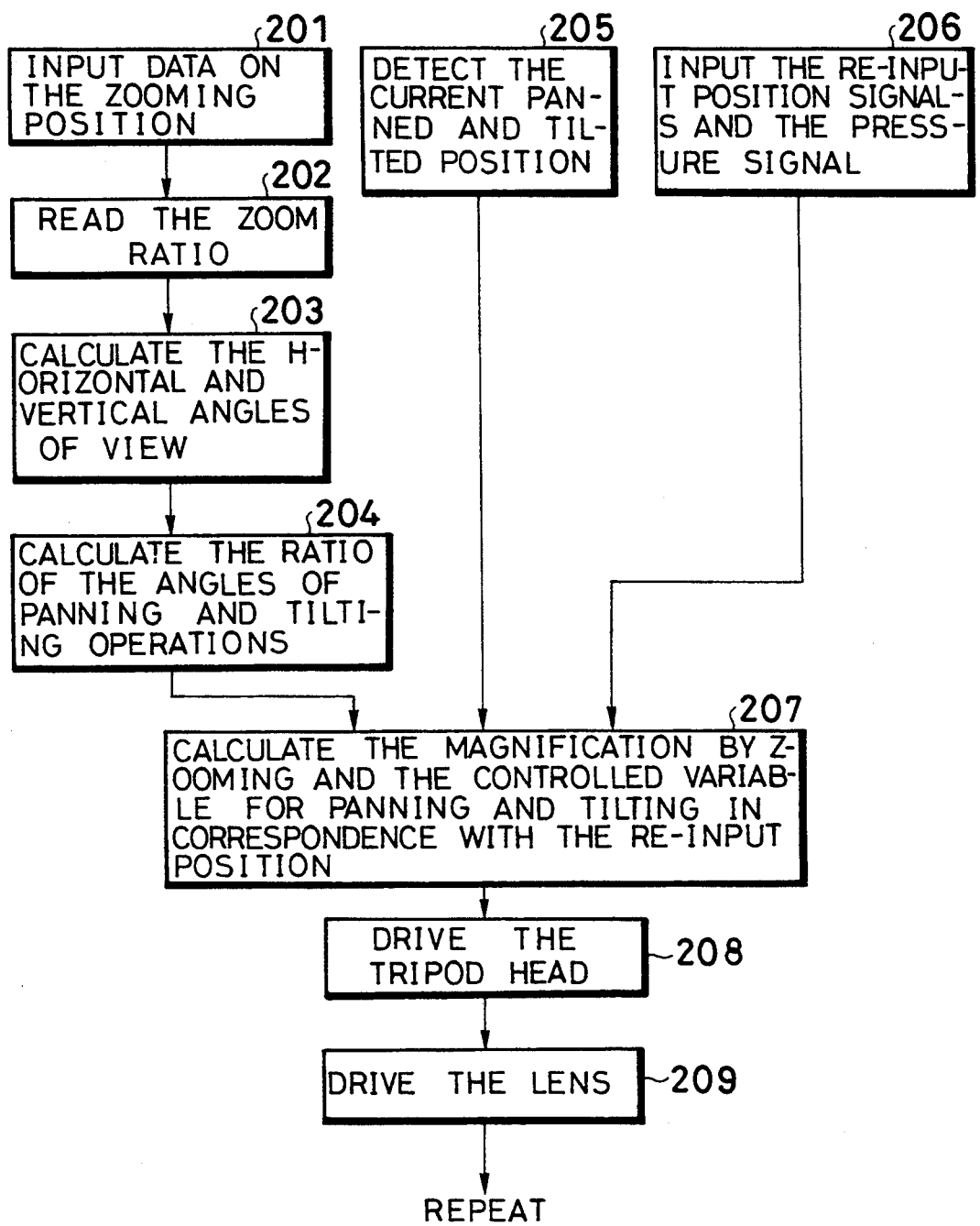
FIG. 11 is a flowchart of a re-inputting operation in the third embodiment.
Figure 12A:
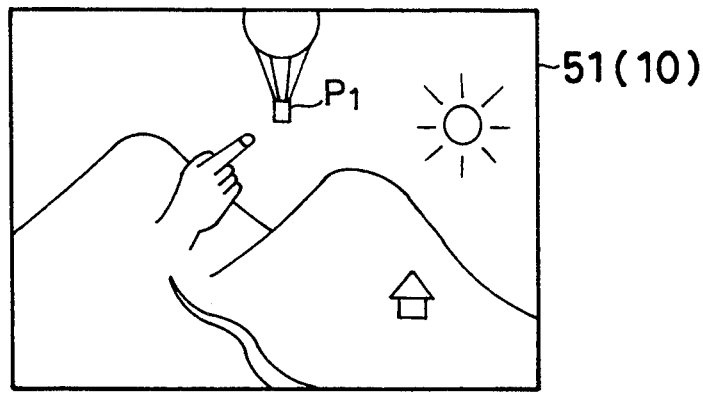
FIG. 12A shows the base picture for a re-inputting operation of the third embodiment.
Figure 12B:
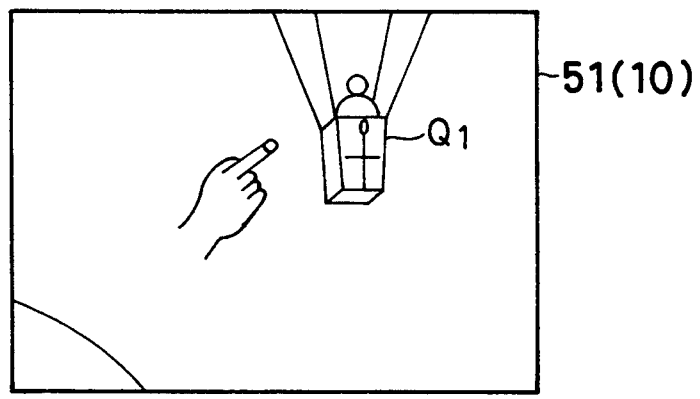
FIG. 12B shows the picture displayed by a first inputting operation of the base picture shown in FIG. 12A.
Figure 12C:
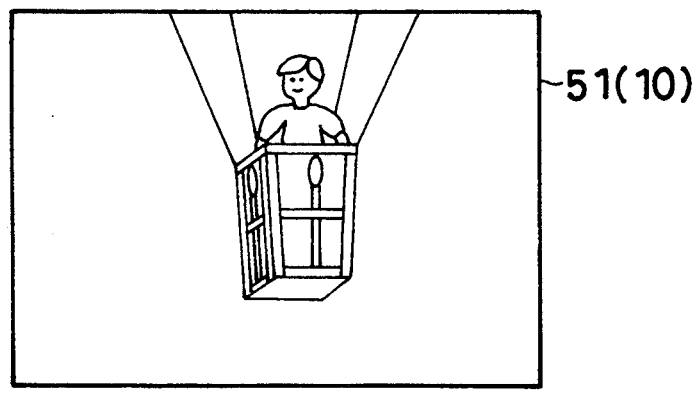
FIG. 12C shows the picture displayed by a re-inputting operation of the base picture shown in FIG. 12B.
Figure 13:
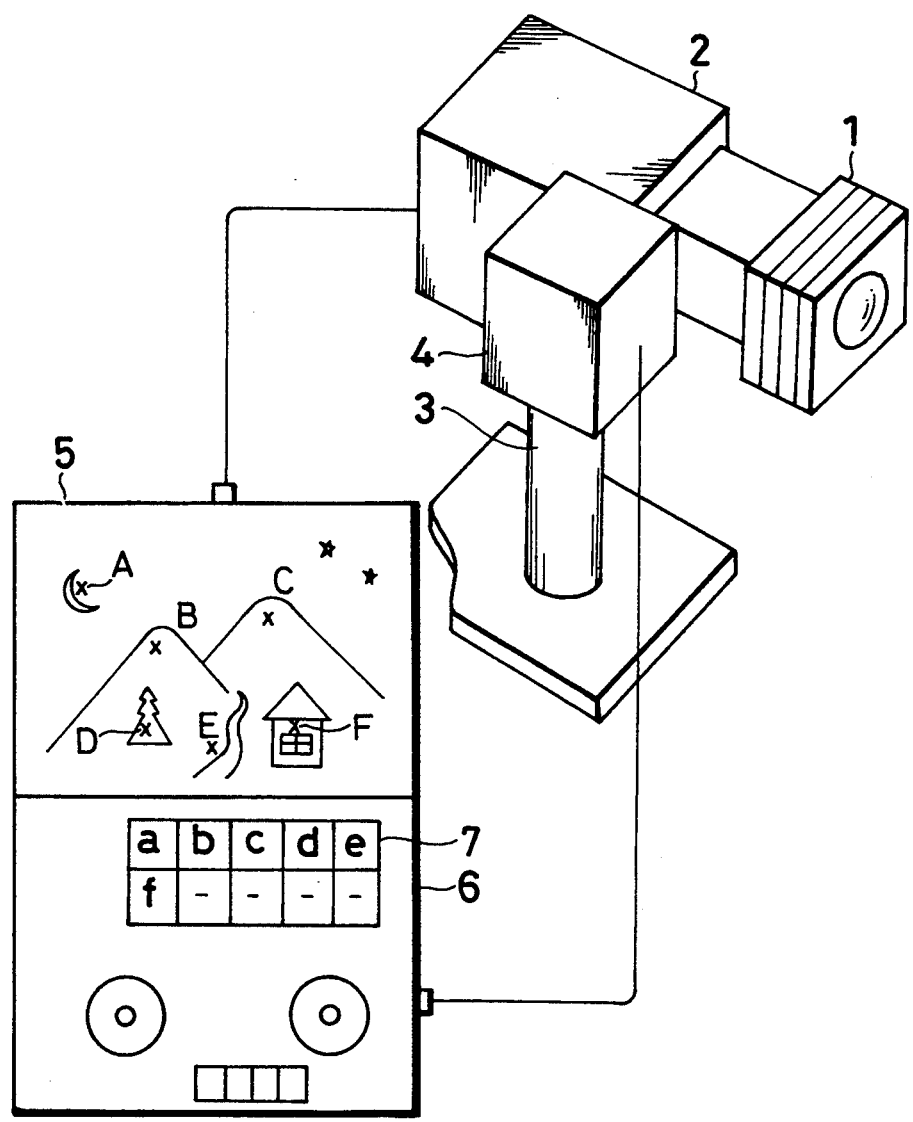
FIG. 13 shows the structure of a conventional TV camera work control apparatus using a tripod head.

FIG. 11 shows the re-inputting operation mainly of the CPU 18, and FIGS. 12A to 12C show the displayed pictures in the process of the re-inputting operation. In FIG. 11, data on the zooming position are supplied to the lens portion 1 to the CPU 18 at step 201, and the data on the zoom ratio (focal length) corresponding to the data on the position are read out of the RAM 20 at step 202. At step 203, the horizontal and vertical angles of view (coordinates region) are calculated, and thereafter the ratio (R) of the angles (quantities) of panning and tilting operations is calculated at step 204. The process then proceeds to step 207. At step 205, the current panned and tilted positions are detected on the basis of the control signal supplied to the tripod head 4 or the feedback signal output from the tripod head 4, and the process proceeds to step 207. At step 206, the position signals (X-axis and Y-axis) and the pressure signal (Z-axis) which are re-input from the touch inputting portion 12 of the touch panel 51 are supplied to the magnification and P/T calculator 59 of the CPU 18, and the process proceeds to step 207.

At step 207, the magnification and P/T calculator 59 calculates a new magnification by zooming and the controlled variable for panning and tilting in correspondence with the re-input position. At the subsequent step 208, the tripod head 4 is driven horizontally and vertically in accordance with the calculated controlled variables for panning and tilting. At step 209, the subject is enlarged or compressed by driving the lens by the calculated magnification by zooming. In the zoom control, as described above, the magnification is determined by the pressure signal supplied from the touch inputting portion 12 every time it is pressed down. Therefore, if the touch inputting portion 12 is pressed down with a smaller force than at a preceding time, the picture is compressed. In order to change the magnification, the touch inputting portion 12 at the center of the touch panel 51 is pressed down.

The example shown in FIGS. 12A to 12C will now be explained. If a position deviated from the position P1 is pressed down by mistake in order to enlarge the gondola of the balloon at P1 in FIG. 12A, the gondola is enlarged as shown in FIG. 12B, in which the gondola is further apart from the center of the screen. In this embodiment, however, when the position Q1 is pressed down in the state shown in FIG. 12B, the shooting operation is corrected and the picture with the gondola situated at the center of the screen is obtained, as shown in FIG. 12C.

When the balloon is moving in the picture shown in FIGS. 12A to 12C, it is possible to catch the moving balloon by sliding the lens in the direction of movement of the balloon while subsequently pressing the corresponding touch inputting portions of the touch panel 51. In this way, according to the third embodiment, it is easy to produce a new picture from the preceding picture by the re-inputting operation of touch inputting portion 12. It is possible to return the screen to the base picture by a simple operation of pressing the reset button 16A of the operation controller 14 shown in FIG. 5.

As described above, according to the third embodiment, since the magnification by zooming is controlled by the pressure applied to the touch inputting portion or the time for which the touch inputting portion is pressed, it is easy to control the zooming operation. Since the parameters for the current shooting operation are calculated from the parameters for the preceding shooting operation when the touch inputting portion is pressed again, it is possible to execute a new shooting operation continuously from the preceding shooting operation. It is therefore easy to modify the zooming operation and shoot a moving subject.

Although the magnification by zooming is set and controlled by the pressure signal supplied from the touch inputting portion 12 in the third embodiment, it is also possible to control the magnification by zooming in accordance with the time for which the touch inputting portion 12 is pressed. In this case, the magnification by zooming may be set and controlled by detecting the time for which the touch inputting portion 12 is pressed and calculating the magnification in correspondence with the detected time by, for example, the CPU 18.

Although the touch panel 51 is divided into 64 touch inputting portions 12 in the above-described embodiments, it is possible to set much more touch inputting portions 12 by dividing the X- and Y-axes into several ten, hundred or thousand coordinates so as to execute minute control of a shooting operation. The touch inputting portion 12 may be pressed down with any other means such as a pen in place of a finger.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A TV camera work control apparatus using a tripod head for controlling both the position and the shooting operation of the lens portion of a TV camera, comprising:
   a touch panel which is disposed on a monitor screen for displaying a picture shot by said TV camera which has a plurality of touch inputting portions being set in a manner as to divide said monitor screen in a matrix; and
   a memory which stores the operation parameters for said tripod head and said lens portion of said TV camera for .shooting at the positions corresponding to said touch inputting portions; wherein
   both the position and the shooting operation of said TV camera are controlled by said operation parameters which are read from said memory when one of said inputting portions is selected.

2. A TV camera work control apparatus using a tripod head according to claim 1, wherein the current operation parameters are corrected with reference to the preceding operating state when a signal is input again from one of said touch inputting portions of said touch panel.

3. A TV camera work control apparatus using a tripod head according to claim 1, wherein the operation parameters of said touch inputting portion of said touch panel are set by an operation controller having joysticks.

4. A TV camera work control apparatus using a tripod head according to claim 1, further comprising a monitor screen on which said touch panel is placed and which displays a base picture and a picture which is controlled by said touch panel.

5. A TV camera work control apparatus using a tripod head according to claim 1, wherein a plurality of said TV cameras and said tripod heads and further a plurality of monitor screens are provided, and a base picture is displayed on one of said monitor screen on which said touch panel is placed, while a picture which is controlled by said touch panel is displayed on another monitor screen.

6. A TV camera work control apparatus using a tripod head for controlling both the position and the shooting operations of a lens portion of a camera, comprising:
   a monitor screen which displays a picture shot by said TV camera and on which said touch panel is placed;
   a parameter calculator for calculating the operation parameters for said tripod head and said lens portion of said TV camera for the entire part of said touch panel when the operation parameters for at least two touch inputting portions are input; and
   a memory for storing said operation parameters for said tripod head and said lens portions of said TV camera which are output from said parameter calculator and which enable a shot at the positions corresponding to said touch inputting portions controlled by said touch panel which is operated while a picture is displayed on said monitor screen, wherein
   said touch inputting portions are set by said the touch panel in such a manner as to divide said monitor screen in a matrix.

7. A TV camera work control apparatus using a tripod head according to claim 6, wherein the operation parameters for said tripod head and said lens portion of said TV camera for the entire part of said touch panel are automatically set by setting the operation parameters for at least two touch inputting portions.

8. A TV camera work control apparatus using a tripod head for controlling both the position and the shooting operation of the lens portion of a TV camera, said apparatus comprising a touch panel divided into a plurality of touch inputting portions so as to control said position and said shooting operation and to control the zooming operation by the magnification which is proportional to the pressure applied to said touch inputting portion or the time for which said touch inputting portion is pressed.

9. A TV camera work control apparatus using a tripod head according to claim 8, wherein the current operation parameters are corrected with reference to the preceding operating state when a signal is input again from one of said touch inputting portions of said touch panel.

* * * * *